United States Patent
Mao et al.

(10) Patent No.: US 11,271,634 B2
(45) Date of Patent: Mar. 8, 2022

(54) METHOD AND APPARATUS FOR SIGNAL DETECTION IN A WIRELESS COMMUNICATION SYSTEM

(71) Applicant: Nokia Technologies Oy, Espoo (FI)

(72) Inventors: Weiqiang Mao, Zhejiang (CN); Yong Chen, Zhejiang (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/765,561

(22) PCT Filed: Nov. 24, 2017

(86) PCT No.: PCT/CN2017/112900
§ 371 (c)(1),
(2) Date: May 20, 2020

(87) PCT Pub. No.: WO2019/100332
PCT Pub. Date: May 31, 2019

(65) Prior Publication Data
US 2020/0313752 A1    Oct. 1, 2020

(51) Int. Cl.
*H04B 7/08*     (2006.01)
*G06N 20/00*    (2019.01)
*G06F 17/18*    (2006.01)
*H04B 7/0413*   (2017.01)

(52) U.S. Cl.
CPC .......... *H04B 7/0842* (2013.01); *G06F 17/18* (2013.01); *G06N 20/00* (2019.01); *H04B 7/0413* (2013.01)

(58) Field of Classification Search
CPC ...... H04B 7/04; H04B 7/0404; H04B 7/0408; H04B 7/0413; H04B 7/0837; H04B 7/0842; H04B 7/10; H04B 10/079; H04B 17/16; H04B 17/18; H04B 17/29; H04B 17/309;
(Continued)

(56) References Cited

U.S. PATENT DOCUMENTS

2008/0130674 A1* 6/2008 Ahmed-Ouameur ........................ H04L 25/0204
370/441
2008/0159425 A1* 7/2008 Khojastepour ..... H04W 72/042
375/260
(Continued)

FOREIGN PATENT DOCUMENTS

| CN | 101383652 A | 3/2009 |
|---|---|---|
| CN | 103916344 A | 7/2014 |

(Continued)

*Primary Examiner* — Young T. Tse
(74) *Attorney, Agent, or Firm* — Harrington & Smith (57) ABSTRACT

Embodiments of the present disclosure relate to methods, apparatuses and computer program products for signal detection in a wireless communication system. A method implemented at a receiver device includes obtaining a set of received signals; determining a channel on which the set of received signals are transported; and detecting a set of transmitted signals from the set of received signals in an iterative manner based on the determined channel, a modulation mode for the set of transmitted signals, and the set of received signals, by using a gradient descent (GD) algorithm. Embodiments of the present disclosure may reduce computation complexity required in signal detection and/or improve detection performance.

20 Claims, 3 Drawing Sheets

(58) Field of Classification Search
CPC ..... H04B 17/318; H04B 17/336; H06F 17/18; H06N 20/00
USPC ....... 375/224, 225, 227, 259, 260, 267, 340, 375/346, 347; 370/332–334, 345; 455/500, 63.1, 63.4, 67.11, 67.13, 67.14
See application file for complete search history.

(56) References Cited

U.S. PATENT DOCUMENTS

| | | | |
|---|---|---|---|
| 2012/0027072 A1* | 2/2012 | Brahma | H04L 27/2647 375/232 |
| 2012/0201320 A1 | 8/2012 | Koike-Akino | 375/267 |
| 2012/0230220 A1* | 9/2012 | Åhlander | H04L 25/03006 370/252 |
| 2014/0348018 A1* | 11/2014 | Bharadia | H04L 5/1423 370/252 |
| 2016/0065275 A1 | 3/2016 | Reuven et al. | 7/413 |
| 2016/0277082 A1 | 9/2016 | Janse van Rensburg et al. | |
| 2018/0287675 A1* | 10/2018 | Sheikh | H04B 7/0413 |

FOREIGN PATENT DOCUMENTS

| | | |
|---|---|---|
| CN | 106953820 A | 7/2017 |
| EP | 3 163 824 A1 | 5/2017 |

* cited by examiner

METHOD AND APPARATUS FOR SIGNAL DETECTION IN A WIRELESS COMMUNICATION SYSTEM

CROSS REFERENCE TO RELATED APPLICATION

This patent application is a U.S. National Stage application of International Patent Application Number PCT/CN2017/112900 filed Nov. 24, 2017, which is hereby incorporated by reference in its entirety.

FIELD

Non-limiting and example embodiments of the present disclosure generally relate to a technical field of wireless communication, and specifically to methods, apparatuses and computer program products for signal detection in a wireless communication system.

BACKGROUND

This section introduces aspects that may facilitate better understanding of the disclosure. Accordingly, the statements of this section are to be read in this light and are not to be understood as admissions about what is in the prior art or what is not in the prior art.

In wireless communication systems, there is always a requirement for high spectrum efficiency (SE) and capacity. Multiple input multiple output (MIMO) techniques have been known as an effective way for improving SE and capacity in wireless communication systems. For example, MIMO has been adopted as a key feature in Long Term Evolution (LTE)/LTE-Advanced (LTE-A) system developed by the third generation project partnership (3GPP). To further enhance SE and throughput, a concept of massive MIMO (mMIMO) has been proposed.

mMIMO means that a huge number of antennas are deployed in a wireless communication system. mMIMO has been considered as a key technology in, for example, the coming fifth generation (5G) system. The number of antennas at a 5G node B (also referred to as a gNodeB) may be more than 128. The large number of antennas promises substantial performance gains, but at the same time brings a challenge in signal detection.

SUMMARY

Various embodiments of the present disclosure mainly aim at providing methods, apparatuses and computer program products for signal detection in a wireless communication system.

In a first aspect of the disclosure, there is provided a method implemented at a receiver device. The method comprises obtaining a set of received signals; determining a channel on which the set of received signals are transported; and detecting a set of transmitted signals from the set of received signals in an iterative manner based on the determined channel, a modulation mode for the set of transmitted signals, and the set of received signals, by using a gradient descent (GD) algorithm.

In an embodiment of the present disclosure, detecting the set of transmitted signals in an iterative manner comprises: in each iteration round, for each of the set of received signals: determining a gradient direction for updating a detected value for each of the set of transmitted signals, based on an detection error caused by the detected value and an associated channel element in the determined channel; determining a learning rate for updating a detected value for each of the set of transmitted signals; and updating the detected value for each of the set of transmitted signals by adding a product of the determined learning rate and the determined gradient direction to the detected value.

In a further embodiment, the gradient direction may be determined as: $(y_i - \Sigma_k h_{ik} * x_k) h^*_{ij}$, where $y_i$ represents a signal received from the ith receiving antenna, $x_k$ represents a signal transmitted from the kth transmitting antenna, $\Sigma$ represents a sum function, $h_{ik}$ represents a channel element from the kth transmitting antenna to the ith receiving antenna, $h_{ij}$ represents a channel element from the jth transmitting antenna to the ith receiving antenna, and $h^*_{ij}$ represents a conjugate of $h_1$, i=1, ... Nr, j and k=1, ... Nt, and Nr and Nt represent the number of receiving antennas and transmitting antennas respectively.

In another embodiment, determining the learning rate may comprise: determining the learning rate based on a product of an initial learning rate and an increasing factor, the initial learning rate and the increasing factor each being less than 1; or determining the learning rate based on a look-up table and at least one of: quality of the channel, the number of the transmitting antennas, and the number of the receiving antennas.

In some embodiments, determining the learning rate may further comprise: normalizing the learning rate by multiplying with $$\frac{HRowLenSquare_i}{maxlenSquare} \text{ or } \frac{1}{maxlenSquare},$$

where $HRowLenSquare_i$ represents a sum of squares of all channel elements in the ith row of the channel, and maxlenSquare represents a maximum value of $HRowLenSquare_i$, where i=1, ... , Nr and Nr is the number of receiving antennas.

In an embodiment, detecting the set of transmitted signals in an iterative manner may comprise: in each iteration, if difference between a detected value of one of the set of transmitted signals and a modulation symbol associated with the modulation mode is less than a proximity threshold, setting the detected value of the one of the set of transmitted signals to the modulation symbol.

In another embodiment, the proximity threshold may depend on the modulation mode.

In some embodiments, detecting the set of transmitted signals in an iterative manner may comprise: determining a set of modulation symbols associated with the modulation mode; determining a maximum real part of the set of modulation symbols; determining a maximum imaginary part of the set of modulation symbols; and in each iteration: if a real part of a detected value for one of the set of transmitted signals exceeds the determined maximum real part, setting the real part to the determined maximum real part; and if an imaginary part of a detected value for one of the set of transmitted signals exceeds the determined maximum imaginary part, setting the imaginary part to the determined maximum imaginary part.

In another embodiment, detecting the set of transmitted signals in an iterative manner may comprise: ceasing the detection in response to: a predetermined number of iteration being met; or difference between detected values for the set of transmitted signals obtained in current iteration round and last iteration round being less than a convergence threshold.

In a second aspect of the disclosure, there is provided a receiver device. The receiver device comprises a processing circuitry and a memory, said memory containing instructions executable by said processing circuitry whereby said receiver device is operative to carry out a method according to the first aspect of the present disclosure.

In a third aspect of the disclosure, there is provided a computer program. The computer program comprises instructions which, when executed by at least one processing circuitry of a device, causes the device to carry out a method according to the first aspect of the present disclosure.

In a fourth aspect of the disclosure, there is provided a computer readable medium having computer program stored thereon which, when executed by at least one processor of a device, causes the device to carry out the method according to the first aspect of the present disclosure.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network device" refers to a node in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink (DL) transmission refers to a transmission from a network device to UE, and an uplink (UL) transmission refers to a transmission in an opposite direction. That is, in DL, the network device is a transmitter and the UE is a receiver device; while in UL, the UE is a transmitter and the network device is a receiver device.

Figure 1:
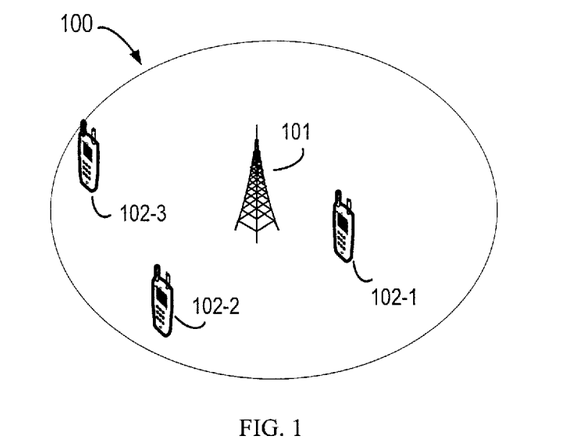
FIG. 1 illustrates an example wireless communication network in which embodiments of the present disclosure may be implemented.

FIG. 1 illustrates an example wireless communication network 100 in which embodiments of the present disclosure may be implemented. As shown, the wireless communication network 100 may include one or more network devices, for example, network device 101. The network device 101 may be in a form of a base station (BS), a Node B (NB), an evolved NB (eNB), a gNB, a virtual BS, a Base Transceiver Station (BTS), or a Base Station Subsystem (BSS), AP and the like.

In this example, network device 101 provides radio connectivity to a set of UEs 102-1, 102-2, and 102-3, which is collectively referred to as "UE(s) 102", within its coverage. It should be appreciated that in some embodiments, the network device may provide service to less or more UEs and the number of UEs in this shown example does not suggest any limitations as to the scope of the present disclosure.

In some embodiments, a network device, e.g., the network device 101 in FIG. 1, may serve UEs, e.g., UE 102 in FIG. 1, within its coverage with a plurality of antennas. For example, the network device 101 may be equipped with a plurality of transmitting antennas, and/or a plurality of receiving antennas. Likewise, in some embodiments, some or all of the UEs 102 may be equipped with a plurality of antennas for transmitting and/or receiving. In addition, a plurality of UEs 102 may be scheduled to transmit or receive in a same or overlapped time-frequency resource, thereby forming a multi-user MIMO (MU-MIMO) scheme. Therefore, in some scenarios, a receiver device (which may be a network device or a UE) may be required to detect signals transmitted from a plurality of antennas.

MIMO detection algorithms have been proposed, for example, in a book titled "Large MIMO systems" by A. Chockalingam and B. Sundar Rajan, and a book titled "Introduction to MIMO communications" by Jerry R. Hampton, both of which provide a detailed introduction about signal detection algorithms, such as zero forcing (ZF), ZF with interference cancellation (ZF-IC), Linear Minimum Mean Square Error (LMMSE), LMMSE with interference cancellation (LMMSE-IC), and the like. In addition, other signal detection algorithms like sphere decoding, probabilistic data association (PDA), approximate message passing (AMP), deep neuron network (DNN) based MIMO detection algorithm etc. have been proposed recently.

However, inventors have observed that all existing MIMO detection algorithms have a disadvantage of high computation complexity or functional limitation. For example, some detection algorithms require calculation of a covariance matrix of a MIMO channel matrix H, and/or an inverse of the channel matrix H. Additionally, some signal detection algorithm does not work for high order quadrature amplitude modulation (QAM) cases. Furthermore, in most detection algorithms, computation complexity increases with the number of the receiving and transmitting antennas in an un-linear manner. This is undesirable, especially for a mMIMO system with a large number of antennas.

To solve at least a part of the above problems, methods, apparatuses and computer program products have been proposed in the present disclosure.

In general, in a MIMO or mMIMO system with Nt transmitting antennas and Nr receiving antennas, a received signal may be expressed as Equation (1):

$$y = Hx + z \tag{1}$$

where y represents a complex vector with size Nr and represents the received signal (also referred to as a receiving signal) from Nr receiving antennas; H is a complex matrix with size Nr by Nt (i.e., Nr rows and Nt columns) and stands for a channel on which the signal y is transported, i.e., a channel passed/experienced by the signal y. H may be obtained via, for example, channel estimation. x is complex vector with size Nt and represents a transmitted signal from Nt transmitting antennas; z is a complex vector with size Nr and represents received noise on Nr receiving antennas.

The term x in equation (1) is the transmitted signal to be detected from the received signal y at the receiver device side, and in some embodiments of the present disclosure, this signal detection problem may be solved by using y, H and modulation information of x as inputs.

Figure 2:
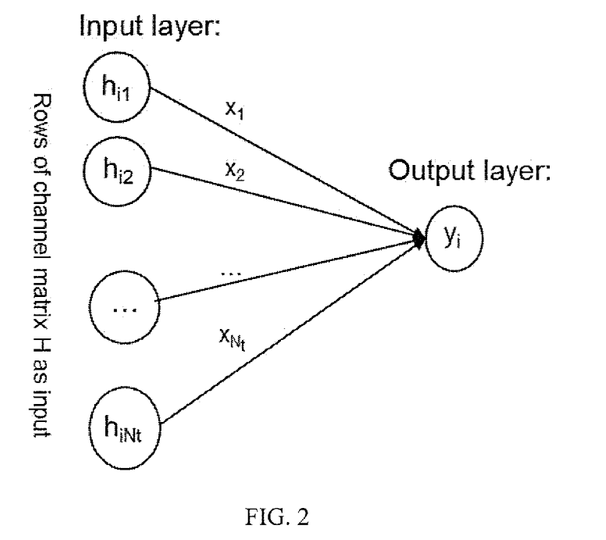
FIG. 2 shows a model of a two layer artificial neuron network (ANN)

Generally speaking, according to some embodiments of the present disclosure, signal detection may be implemented based on a model of a simple two layer artificial neuron network (ANN) shown in FIG. 2. In particular, as shown in FIG. 2, with this ANN model, each row vector ($h_{i1}$, $h_{hd\ i2}$, ... $h_{iNt}$) of the channel matrix H is considered as an input vector, the received value $y_i$ associated with a corresponding row of H is considered as an output, while vector $x=[x_1, x_2, \ldots x_{Nt}]$ is modelled as weights to be learned.

With this model, an activation function in the output layer may be represented as $f(x)=x$, and there are Nr data samples in total. In a wireless communication system (e.g., 5G) with mMIMO, the number of receiving antennas at a receiver device (e.g., a gNodeB) may be more than 128, and therefore, the number of data samples is enough to learn the weights x which is the transmitted symbols to be detected.

In some embodiments, a Gradient descent (GD) algorithm, which is conventionally used in machine learning and other related areas, is proposed to be used for solving the signal detection problem.

As an example rather than limitation, a loss function expressed with equation (2) may be used in the GD algorithm.

$$E(x) = \tfrac{1}{2} \Sigma_i |y_i - \Sigma_k h_{ik} * x_k|^2 \qquad (2)$$

where | | represents modulus of a complex value. The loss function in this example is a sum of error squares, and is a convex function, which guarantees that the GD algorithm will converge to an optimal solution.

By using the GD algorithm for detecting the transmitted signal x, computation complexity required is only O(Nr*Nt). Moreover, better symbol error rate (SER) can be achieved compared with legacy MMSE MIMO detection algorithms. Further, since GD algorithm is based on a simple ANN model, developed ANN technologies (for example, hardware parallel processing) can be used directly. Additionally, embodiments of the present disclosure may provide a framework for building more complex multi-layer type ANN mMIMO detection schemes. In particular, due to unfolding property of each GD iteration, it enables to provide a flexible mMIMO detection solution. That is, it is easy to add new functions into each iteration operation as needed, to obtain more complex and advanced detection solutions.

Figure 3:
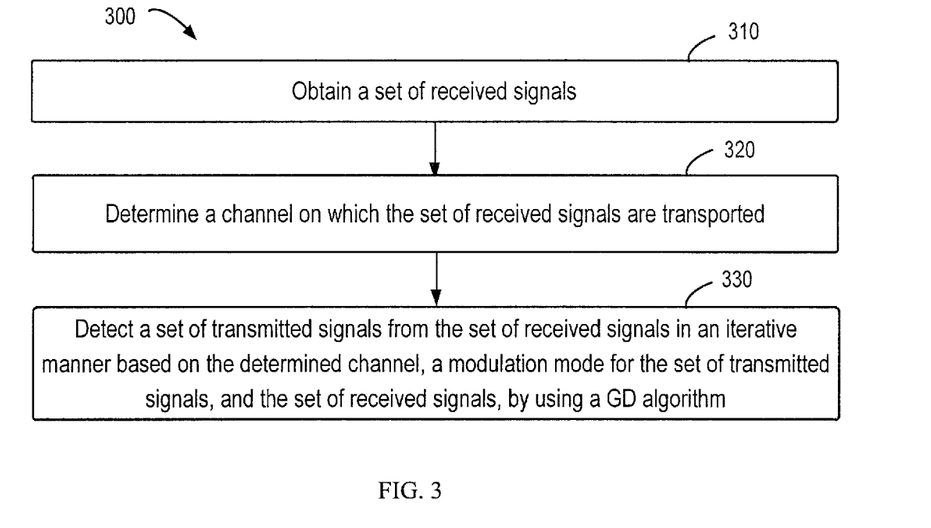
FIG. 3 shows a flowchart of a method at a receiver device for signal detection in a wireless communication system according to an embodiment of the present disclosure.

FIG. 3 shows a flowchart of a method 300 implemented at a receiver device for signal detection in a wireless communication system. The receiver device may be, for example, the network device 101 or UE 102 shown in FIG. 1. For ease of discussion, the method 300 will be described below with reference to network device 101 and the communication network 100 illustrated in FIG. 1. However, embodiments of the present disclosure are not limited thereto.

At block 310, the network device 101 obtains a set of received signals. For example, the set of received signals may be received from Nr receiving antennas, and may be denoted as a vector y with a size Nr. Note that the set of received signals may be received from one or more UEs, for example, one or more UEs 102 in FIG. 1.

At block 320, the network device 101 determines a channel on which the set of received signals are transported, or in other words, a channel passed/experienced by the set of received signals. In a scenario of MIMO communication, the channel may be represented by and called a channel matrix H. It is to be understood that embodiments are not limited to any specific way for obtaining the channel matrix H. Just for illustration purpose, the channel matrix H may be known in advance or obtained via channel estimation. Any blind channel estimation algorithm or channel estimation algorithm based on pilots, reference signals, or training sequences may be used for this purpose. For ease of discussion, assuming there are Nt transmitting antennas and Nr receiving antennas, then the determined channel matrix H has a size of Nr by Nt, i.e., it has Nr rows and Nt columns.

At block 330, the network device 101 detects a set of transmitted signals x from the set of received signals y in an iterative manner, based on the determined channel H, a modulation mode for the set of transmitted signals x, and the set of received signals y, by using the GD algorithm.

In general, GD algorithms include batch gradient descent (BGD) algorithms and stochastic gradient descent (SGD) algorithms. With BGD, all data samples or a subset of the data samples are processed in a batch, then errors caused by detection are summed and used for updating the detection of the set of transmitted signals x. Since x may be modelled as weights in an ANN model as shown in FIG. 2, the signal detection of x is also referred to as weight updating herein. With SGD, GD weights updating is performed for each sample data directly.

SGD or BGD can be used at block 330. In some embodiments, SGD may be used, so as to obtain channel space diversity gains, and/or, to make the detection converge quickly. However, it should be appreciated that embodiments are not limited to BGD or SGD algorithms.

In some embodiments, at block 330, in each iteration round, the network device 101 may update the detection for the set of transmitted signals x. For example, in each iteration round, for each of the set of received signals ($y_j$, corresponding to the jth row of the channel matrix H), the network device 101 determines a gradient direction d for updating a detected value for each of the set of transmitted signals $x_i$. The gradient direction d may be determined based on a detection error caused by the detected value and an associated channel element $h_{ij}$ in the determined channel matrix H. Additionally, the network device 100 determines a learning rate R for updating a detected value for each of the set of transmitted signals, and updates the detected value for each of the set of transmitted signals by adding a product of the determined learning rate R and the determined gradient direction d to the detected value. That is, the network device 101 updates the detection for the transmitted signal x as:

$$x = x + d * R \qquad (3).$$

That is, in each iteration round, the network device 101 updates the detection for each of the transmitted signals x, based on each row of the channel matrix H, respectively, and then proceeds to next iteration round. In the context of the present disclosure, each iteration round is also called an epoch, and each updating based on one row of the channel matrix is also called an iteration.

For instance, the network device 101 may determine the gradient direction d by equation (4):

$$d = (y_i - \Sigma_k h_{ik} * x_k) h^*_{ij} = \delta_i \cdot h^*_{ij} \qquad (4)$$

where $$\delta_i = y_i - \Sigma_k h_{ik} * x_k \qquad (4a)$$

$\delta_i$ represents detection error, $y_i$ represents a signal received from the ith receiving antenna, $x_k$ represents a signal transmitted from the kth transmitting antenna, $\Sigma$ represents a sum function, $h_{ik}$ represents a channel element from the kth transmitting antenna to the ith receiving antenna, $h_{ij}$ represents a channel element from the jth transmitting antenna to the ith receiving antenna, and $h^*_{ij}$ represents a conjugate of $h_{ij}$, i=1, ... Nr, j and k=1, ... Nt, and Nr and Nt represent the number of receiving antennas and transmitting antennas, respectively.

In an embodiment, the network device 101 may adopt a SGD algorithm at block 330, and use a loss function defined in equation (5):

$$E_i = \tfrac{1}{2} |y_i - \Sigma_k h_{ik} * x_k|^2 \qquad (5)$$

where $E_i$ represents a loss value corresponding to the ith row of the channel matrix H. Based on this loss function, the best gradient direction d may be obtained, for example, by calculating the differential of $E_i$ for each $x_j$, as below $$d = -\frac{\partial E_i}{\partial x_j} = \left( y_i - \sum_k h_{ik} * x_k \right) h^*_{ij} \qquad (6)$$

However, it should be appreciated that embodiments are not limited to the specific way for obtaining the gradient direction d.

Alternatively, or in addition, in other embodiments, the network device 101 may determine the learning rate R based on a product of an initial learning rate η and an increasing factor γ, and both the initial learning rate η and the increasing factor γ is less than 1. For example rather than limitation, R may be determined as:

$$R = \eta * \gamma \quad (7)$$

In a further embodiment, the increasing factor γ may be specific to an iteration round (i.e., epoch), and in this case the increasing factor may be denoted as $\gamma^{ep}$. In other words, the increasing factor γ may be different for different iteration rounds. It enables to adjust the step size for updating the detection in each iteration round.

Alternatively, in another embodiment, the network device 101 may determine the learning rate based on a look-up table and at least one of: quality of the channel, the number of the transmitting antennas, and the number of the receiving antennas. For instance, the network device 101 may use a received signal to noise ratio (SNR), Nr, and Nt as inputs to acquire a suitable learning rate R from the lookup table.

In some embodiments, optimized learning rates may be obtained in advance, for example, by machine searching and stored in a loop-up table for later use. For illustration purpose, some learning rate obtained via computer searching for different modulation modes, SNR status and antenna configurations are listed in Table 1 to Table 4.

TABLE 1

Learning rate for 4QAM

| SNR | 8 dB | 9 dB | 10 dB | 11 dB | 12 dB | 13 dB | 14 dB |
|---|---|---|---|---|---|---|---|
| Nr = 64 Nt = 16 | 0.3 | 0.4 | 0.4 | 0.6 | 0.7 | 0.7 | 0.7 |
| Nr = 128 Nt = 16 | 0.3 | 0.4 | 0.4 | 0.6 | 0.7 | 0.7 | 0.7 |
| Nr = 64 Nt = 32 | 0.6 | 0.7 | 0.7 | 0.7 | 0.7 | 0.7 | 0.7 |
| Nr 128 Nt = 32 | 0.3 | 0.4 | 0.4 | 0.6 | 0.7 | 0.7 | 0.7 |

TABLE 2

Learning rate for 16QAM

| SNR | 8 dB | 9 dB | 10 dB | 11 dB | 12 dB | 13 dB | 14 dB |
|---|---|---|---|---|---|---|---|
| Nr = 64 Nt = 16 | 0.3 | 0.3 | 0.3 | 0.3 | 0.4 | 0.4 | 0.4 |
| Nr = 128 Nt = 16 | 0.2 | 0.2 | 0.2 | 0.2 | 0.2 | 0.2 | 0.4 |
| Nr = 64 Nt = 32 | 0.6 | 0.7 | 0.7 | 0.7 | 0.7 | 0.7 | 0.7 |
| Nr 128 Nt = 32 | 0.3 | 0.3 | 0.3 | 0.3 | 0.3 | 0.3 | 0.3 |

TABLE 3

Learning rate for 64QAM with low SNR

| SNR | 8 dB | 9 dB | 10 dB | 11 dB | 12 dB | 13 dB | 14 dB |
|---|---|---|---|---|---|---|---|
| Nr = 64 Nt = 16 | 0.3 | 0.3 | 0.3 | 0.3 | 0.3 | 0.4 | 0.4 |
| Nr = 128 Nt = 16 | 0.2 | 0.2 | 0.2 | 0.2 | 0.2 | 0.2 | 0.2 |
| Nr = 64 Nt = 32 | 0.6 | 0.6 | 0.6 | 0.7 | 0.7 | 0.7 | 0.7 |
| Nr 128 Nt = 32 | 0.3 | 0.3 | 0.3 | 0.3 | 0.3 | 0.4 | 0.4 |

TABLE 4

Learning rate for 64QAM with high SNR

| SNR | 16 dB | 20 dB | 24 dB | 28 dB | 32 dB | 36 dB | 40 dB |
|---|---|---|---|---|---|---|---|
| Nr = 64 Nt = 16 | 0.4 | 0.4 | 0.7 | 0.7 | 0.7 | 0.7 | 0.7 |
| Nr = 128 Nt = 16 | 0.2 | 0.4 | 0.7 | 0.7 | 0.7 | 0.7 | 0.7 |
| Nr = 64 Nt = 32 | 0.7 | 0.7 | 0.7 | 0.7 | 0.7 | 0.7 | 0.7 |
| Nr 128 Nt = 32 | 0.4 | 0.4 | 0.7 | 0.7 | 0.7 | 0.7 | 0.7 |

Parameters for computer simulation to search for the above learning rates are listed in Table 5 and Table 6. In addition, during the simulation, γ in equation (7) is set to 1, and each channel element in the channel matrix H is generated according to a normal distribution N(0,1), then normalized by H=H/sqrt(Nt). Noise Z in equation (1) is generated according to a normal distribution N(0,1), then normalized by Z=Z/(10^(SNR/10)). The transmitted signals x is normalized by x=x/var(x), where var(x) means the variance of symbol x.

TABLE 5

504 cases for low SNR

| Parameters | Values |
| --- | --- |
| Learning rate | 0.2~0.7 |
| Number of transmitted symbols Nt | 16; 32 |
| Number of received antenna Nr | 64; 128 |
| QAM | 4 QAM; 16 QAM; 64 QAM |
| SNR | 8 dB~14 dB |
| Number of Epoch | 5 |

TABLE 6

168 cases for high SNR

| Parameters | Values |
| --- | --- |
| Learning rate | 0.2~0.7 |
| number of transmitted symbols Nt | 16; 32 |
| number of received antenna Nr | 64; 128 |
| QAM | 64 QAM |
| SNR | 16 dB; 20 dB; 24 dB; 28 dB; 32 dB; 36 dB; 40 dB |
| Number of Epoch | 5 |

In some embodiments, it is also possible to use lower learning rate value while setting bigger epoch round for GD updating.

Furthermore, to obtain a better convergence property, in some embodiments, the determined learning rate R may be further normalized by the network device 101. As an example rather than limitation, the network device 101 may normalize the learning rate R by multiplying it with a factor $$\frac{HRowLenSquare_i}{maxlenSquare} \text{ or } \frac{1}{maxlenSquare},$$

where $HRowLenSquare_i$ represents a sum of squares of all channel elements in the ith row of the channel matrix i.e., $HRowLenSquare_i = \Sigma_j |h_{i,j}|^2$. maxlenSquare represents a maximum value of $HRowLenSquare_i$, i.e., $maxlenSquare = max_i\{RowLenSquare_i\}$, where i=1, ..., Nr and Nr is the number of receiving antennas.

Accordingly, in some embodiments, detection for the jth transmitted signal $x_j$ may be updated using equation (8) or (9):

$$x_j = x_j + \frac{HROWLenSquare_i * \text{rate} * \delta_i * h_{i,j}^*}{maxlenSquare} \quad (8)$$

$$x_j = x_j + \frac{\text{rate} * \delta_i * h_{ij}^*}{maxlenSquare}. \quad (9)$$

For instance, if maxlenSquare<=1, $x_j$ may be update based on (8) or (9), and if maxlenSquare>1, $x_j$ may be updated based on (9).

The above factor $$\frac{HRowLenSquare_i}{maxlenSquare} \text{ and } \frac{1}{maxlenSquare}$$

provide a way to adjust the learning rate by normalization, thereby ensuring the convergence of the iteration.

Alternatively, or in addition, in some embodiments, in order to further improve the convergence property of the detection algorithm, at block 330, if a detected value for one transmitted signal $x_j$ is already close enough to one modulation value associated with the modulation mode of the transmitted signal (e.g., 64QAM, or QPSK), the network device 101 may set the detection value for the transmitted signal $x_j$ as that modulation value. This helps to achieve quick convergence and avoid learning overfit.

For example, at block 330, in each iteration, if difference between a detected value of one of the set of transmitted signals $x_j$ and a modulation symbol (denoted as my) associated with the modulation mode is less than a proximity threshold $T_{prox}$, the network device 101 may set/anchor the detected value of the one of the set of transmitted signals to the modulation symbol my. That is:

if $|mv-x_j|<T_{prox}$, then set $x_j=mv$;

where $x_j$ represents the ith transmitted signal. Such operation is also referred to as an anchoring operation thereafter.

In some embodiments, the proximity threshold $T_{prox}$ may depend on the modulation mode. For example, the proximity threshold $T_{prox}$ may be different for QPSK and 16QAM modulation modes. For illustration rather than limitation, in some embodiments, the proximity threshold $T_{prox}$ may be determined as:

$$T_{prox} = \text{anRate} * \text{stepValue} \quad (10)$$

where anRate represents an initial anchor rate, which may be set to be, for example but not limited to, 0.1, while the step Value represents an adaptive factor which may depend on the modulation mode for the transmitted signals. For instance, the stepvalue for a modulation mode may be set to the nearest distance between modulation symbols associated with the modulation mode. For QPSK, values of the modulation symbols may be expressed as:

$$SMV=+\{x+yj\} \text{ for } x,y\in\{-1,1\} \quad (11)$$

In this example, the nearest distance between these symbols is 2. As a result, step Value for QPSK may be set to 2. Likewise, for 16QAM, values for the modulation symbols may be expressed as:

$$SMV=\{x+yj\} \text{ for } x,y\in\{-1,-\frac{1}{3},\frac{1}{3},1\} \quad (12)$$

In this case, the nearest distance between these symbols is ⅔, so stepValue for 16QAM may be set to ⅔.

Alternatively, or in addition, in some embodiments, to achieve quick convergence, at block 330, the network device 101 may put a constraint on the detected value for the transmitted signal x. For example, the network device 101 may determine a set of modulation symbols associated with the modulation mode (for example, using equation (11) or (12) for QPSK and 16QAM respectively). For the set of modulation symbols, the network device 101 determines a maximum real part and a maximum imaginary part. The maximum real part and the maximum imaginary part serve as a limit for the real part and imaginary part of the detected signal respectively. That is, in each iteration, if a real part of a detected value for one of the set of transmitted signals (e.g., the jth transmitted signal $x_j$) exceeds the determined maximum real part, the network device 101 sets the real part to the determined maximum real part. Likewise, if an imaginary part of a detected value for one of the set of transmitted signals exceeds the determined maximum imaginary part, the network device 101 sets the imaginary part to the determined maximum imaginary part.

As an example rather than limitation, computer instructions for an anchor function (denoted as anchor ( )) for implementing the above optional anchoring operations for improving the convergence property may be constructed as the following:

```
Initialization:
set anchor rate: anRate. For example, anRate=0.1
calculate the stepvalue for SMV, which is the symbol neighbour's nearest
distance. for example: for QPSK, stepvalue=2; For 16QAM,
stepvalue=2/3.
anchor( ) main routine:
for j=0 to Nt:
        #real(x) to get real value of complex x; imag(x) to get imag
        value of complex x.
        #real(SMV) is all SMV element's real value composed set.
        #imag(SMV) is all SMV element's imag value composed set.
        #x value cannot be bigger or less than the biggest or lest real
        or imag value in
SMV.
    if real(x_j)>max(real(SMV)):
        real(x_j)=max(real(SMV))
    if real(x_j)<min(real(SMV)):
        real(x_j)=min(real(SMV))
    if imag(x_j)>max(imag(SMV)):
        imag(x_j)=max(imag(SMV))
    if imag(x_j)<min(imag(SMV)):
        imag(x_j)=min(imag(SMV))
    find the nearest modulation value mv for x_j: mv =
    argmin_{mv∈SMV}|mv − x_j|
    if|mv− x_j | <anRate*stepValue, set x_j =mv
#end of loop
output the anchored weights
#anchor( ) function ended
```

The anchoring operation may bring several benefits, such as quick convergence, and ANN overfit avoidance. For instance, if all the weights (i.e., transmitted signals x) can be anchored, the GD based iteration operation can be stopped immediately. In addition, in some embodiments, the anchoring operation also helps to improve mMIMO detection accuracy, e.g., symbol error rate may be reduced, since noise caused by the transmitted signal being anchored is removed.

The detection at block 330 may be terminated in response to various conditions. For example, in some embodiments, the network device 101 may cease the detection at block 330 if a predetermined number of iteration rounds (epoch) has been reached. This way of ending the detection may be referred to as EC1 hereafter.

Alternatively, in some embodiments, the difference between detected values for the set of transmitted signals obtained in current iteration round and last iteration round may be determined. If the different falls below a convergence threshold, the detection may be terminated. For example, the network device may cease the update if a change in the transmitted signal x caused by updating is less than a convergence threshold ∈, i.e., $$|x_{cur} - x_{pre}|^2 < \in \quad (13)$$

where ∈ represents a pre-defined convergent threshold; $x_{cur}$ represents detected value for x in current iteration round, and $x_{pre}$ represents detected value for x in last iteration round. This way for ending the iteration round may be referred to as EC2 hereafter.

In some embodiments, the iteration/updating may be ceased by using a hybrid method of EC1 and EC2. That is, the network device 101 may end the updating if predetermined number of iteration rounds has been finished, or if the change in x is already less than ∈ shown in Equation (12). The hybrid way for stopping the updating may be referred to as EC3.

For illustration purpose and without limitation, computer procedures for implementing GD based signal detection with method EC3 for ending the update may be constructed as below:

```
Input:
    Channel estimation H, which is Nr*Nt matrix.
    Received signal y, which is Nr*1 matrix
    Modulation mode of transmitted symbol x, here each symbol x
    can use different
modulation mode.
Output:
    Decoded symbol x, which is Nt*1 matrix
Initialization:
    Set GD end condition: epoch value based; threshold value based;
    or both epoch
value and threshold value based. Set epoch value and ∈ value.
    Set initial weights value x=0.
    Set learning rate method:
        Method 1: based on initial learning rate value η and
        learning rate epoch
    level decreasing rate γ , both two value shall be less than 1.
        Method 2: based on pre-defined lookup table, the
        pre-defined table can be
    built based on the experience or testing.
        #anchor( ) function is not mandately, but it's helpful for
        avoiding overfit
        Set anchor rate value: anRate, for exmaple 0.1. this parameter
        is used in anchor( )
function
        #optional initialization part is not mandately, but it's helpful for
        quick convergent.
        Optional initialization:
        Calculate H matrix's row length square: HRowLenSquare,
        which is Nr*1 matrix
        Calculate maximum H row length square:
        maxlenSquare=max(HRowLenSquare)
        H row order can be adjusted, for example, based on
        HRowLenSquare descently
    GD based mMIMO main routine:
        For ep=0 to epoch:
            #this step is to set learning rate, two ways are suggested:
            Set learning rate for this epoch: rate=η* γ^{ep} or rate is
            selected based on
        pre-defined lookup table
            #if anchor( ) function is enabled, call it one time in each
            epoch round:
            Call anchor( )
            #if anchor( ) find the learned weights are already good
            enough, quit
```

```
            immediately.
                If all weights can be anchored:
                    quit the epoch loop
                #start doing GD updating for each row of H:
                For i=0 to Nr:
                    For i-th H row, calculate the error based on (4a):
                    For j=0 to Nt:
                        If optional initialization used:
                            If maxlenSquare<=1, weights update can be based
                            on (8) or (9); If
                    maxlenSquare>1, weights update can be based on (9);
                        If optional initialization is not used, do the
                        weights updating based
                    on (3)-(4a);
                        If all H's rows' GD updating is finished in this
                        epoch round, check
                    the end condition:
                        If equation (13) is true, GD updating is finished,
                        quit the epoch
                loop
                    #end of the GD updating loop
            #end of the epoch loop
            Output the decoded weights:
                If output is softbits, just output the learned weights
                If output is hardbit, find the nearest symbol value
                    from SMV for each
        weight as output
                #GD based mMIMO detection algorithm ended
```

Figure 4:
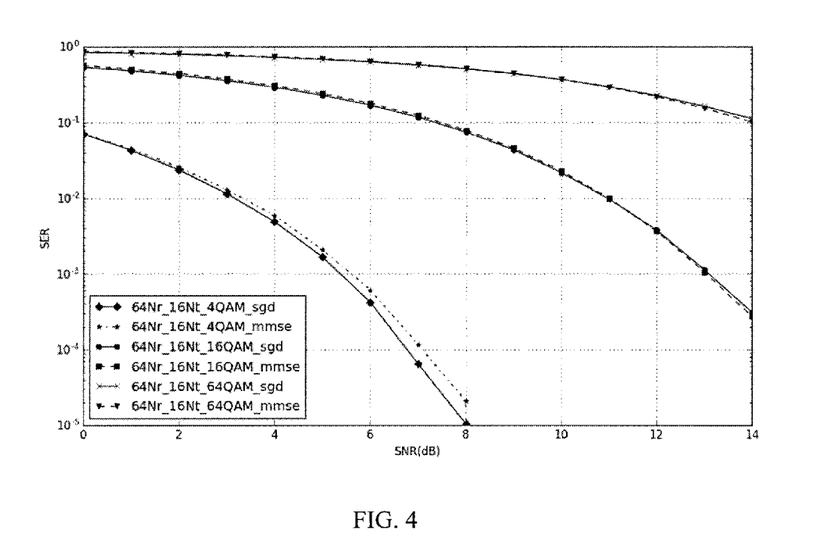
FIG. 4 shows performance comparison of signal detection method according to an embodiment of the present disclosure and a conventional method.

To verify advantage of the proposed detection solution, performance of some embodiments of GB based signal detection methods have been compared with a conventional MMSE method, and results of the comparison are shown in FIG. 4.

During the comparison, end condition EC1 is adopted, and the number of iteration rounds (epoch) is set to 10. In addition, the learning rate R is set to a constant value of 0.3 for all different SNR and all epoch round, and its normalization is based on 1/maxlenSquare. Anchoring operation is used and in which the anRate in equation (10) is set to 0.1. For each SNR case, 30000 data samples are used to obtain the result.

The results show that GD based detection is better than MMSE based detection in 4QAM case in terms of SER performance. In some embodiments, the performance improvement is guaranteed by the loss function which is a convex function and ensures convergence of the GD based updating. Furthermore, the proposed GD based detection solution does not involve any channel matrix transformation (for example, no need for calculating covariance matrix or pseudo inversion of the channel matrix H), and as a result, all channel spatial diversity properties are kept. This feature also contributes the better performance.

As shown in FIG. 4, for 16QAM and 64QAM cases, GD based detection and MMSE based detection achieve almost the same performance. However, GD-based detection requires less computation complexity. In particular, the computation complexity of GD based detection is only $O(Nr*Nt)$. During the detection, iteration can be stopped if anchoring operation finds that weights x are already close enough to expected symbols, therefore average number of iteration round needed is small.

In addition, the proposed detection method is based on the design of ANN, which means that developed ANN technologies can be reused in the detection. For example, it can support parallel processing in ANN supported hardware.

The proposed detection solution is also flexible. It is easy to add more advanced functions into each iteration or iteration round. For example, in some embodiments, anchoring operation and/or normalization operation for the learning rate may be added. This makes it possible for the solution to benefit from further development.

It should also be noted that embodiments of the present disclosure can be applied widely in various scenarios. For example, some embodiments may be used for complex mMIMO signal detection, and support different modulations, different SNRs, and different antenna numbers, etc.

Figure 5:
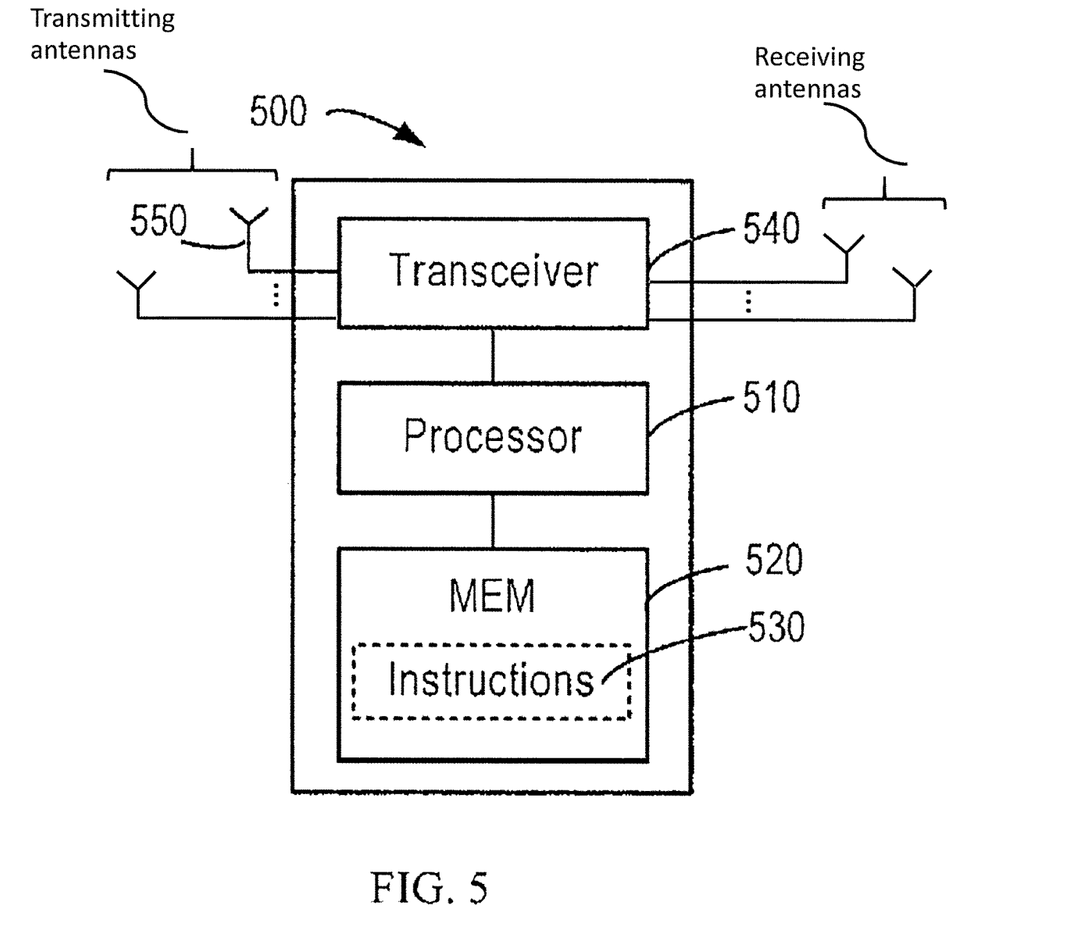
FIG. 5 illustrates a simplified block diagram of an apparatus that may be embodied as/in a network device and an apparatus that may be embodied as/in a terminal device.

FIG. 5 illustrates a simplified block diagram of an apparatus 500 that may be embodied in/as a network device, for example, the network device 101 shown in FIG. 1, or embodied in/as a terminal device, for example, the terminal device 102 shown in FIG. 1.

As shown by the example of FIG. 5, apparatus 500 comprises a processor 510 which controls operations and functions of apparatus 500. For example, in some embodiments, the processor 510 may implement various operations by means of instructions 530 stored in a memory 520 coupled thereto. The memory 520 may be any suitable type adapted to local technical environment and may be implemented using any suitable data storage technology, such as semiconductor based memory terminal devices, magnetic memory terminal devices and systems, optical memory terminal devices and systems, fixed memory and removable memory, as non-limiting examples. Though only one memory unit is shown in FIG. 5, a plurality of physically different memory units may exist in apparatus 500.

The processor 510 may be any proper type adapted to local technical environment, and may include one or more of general purpose computers, special purpose computers, microprocessors, digital signal processors DSPs and processors based on multicore processor architecture, as non-limiting examples. The apparatus 500 may also comprise a plurality of processors 510.

The processors 510 may also be coupled with a transceiver 540 which enables reception and transmission of information by means of one or more antennae 550 and/or other components. For example, the processor 510 and the memory 520 can operate in cooperation to implement method 300 described with reference to FIG. 3. It shall be appreciated that all the features described above with reference to FIG. 3 also apply to apparatus 500, and therefore will not be detailed here.

Various embodiments of the present disclosure may be implemented by a computer program or a computer program product executable by one or more of the processors (for example processor 510 in FIG. 5), software, firmware, hardware or in a combination thereof.

Although some of the above description is made in the context of a wireless communication system shown in FIG. 1, it should not be construed as limiting the spirit and scope of the present disclosure. The principle and concept of the present disclosure may be more generally applicable to other scenarios.

In addition, the present disclosure also provides carrier containing the computer instructions 530. The carrier may be computer readable storage medium such as a memory containing the computer program or computer program product as mentioned above. The computer-readable media may include, for example, magnetic disks, magnetic tape, optical disks, phase change memory, or an electronic memory terminal device like a random access memory (RAM), read only memory (ROM), flash memory devices, CD-ROM, DVD, Blue-ray disc and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (for example, procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by a computer program or a computer program product which includes computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. The protection sought herein is as set forth in the claims below.

Some abbreviations used in the present disclosure and their corresponding expressions are list below:
GD: gradient descent
BGD: batch gradient descent
SGD: stochastic gradient descent
MIMO: multiple input multiple output antenna system
mMIMO: massive multiple input multiple output antenna system
SVD: singular value decomposition
5G: the fifth generation telecommunication system
gNodeB: 5G NodeB
AWGN: additive white gaussian noise
ZF: zero forcing
ZF-IC: zero forcing with inteference cancellation
LMMSE: linear minimum mean square error
LMMSE-IC: linear minimum mean square error with inteference cancellation
PDA: probabilistic data association
MCMC: Markov Chain Monte Carlo
SDR: semidefinite relaxation
QAM: Quadrature Amplitude Modulation
ANN: artificial neuron network
DNN: deep neuron network
SER: symbol error ratio
SNR: signal noise ratio

What is claimed is:

1. A method for detecting a transmitted signal, comprising:
obtaining a set of received signals;
determining a channel on which the set of received signals are transported; and
detecting a set of transmitted signals from the set of received signals in an iterative manner with using a gradient descent algorithm and based on the determined channel, a modulation mode for the set of transmitted signals and the set of received signals;
wherein detecting the set of transmitted signals in the iterative manner comprises:
in each iteration round:
for each of the set of received signals,
determining a gradient direction for updating a detected value for each of the set of transmitted signals, based on a detection error caused with the detected value and an associated channel element in the determined channel;
determining a learning rate for updating the detected value for each of the set of transmitted signals; and
updating the detected value for each of the set of transmitted signals with adding a product of the determined learning rate and the determined gradient direction to the detected value.

2. The method of claim 1, wherein the gradient direction is determined as:

$$\left(y_i - \sum_k h_{ik} * x_k\right) h_{ij}^*$$

where $y_i$ represents a signal received from an ith receiving antenna, $x_k$ represents a signal transmitted from a kth transmitting antenna, $\Sigma$ represents aسsum function, $h_{ik}$ represents a channel element from the kth transmitting antenna to the ith receiving antenna, $h_{ij}$ represents a channel element from a jth transmitting antenna to the ith receiving antenna, and $h^*_{ij}$ represents a conjugate of $h_{ij}$, i=1, ... Nr, j and k=1, ... Nt, and Nr and Nt denote a number of receiving antennas and transmitting antennas respectively.

3. The method of claim 1, wherein determining the learning rate comprises:
    determining the learning rate based on a product of an initial learning rate and an increasing factor, the initial learning rate and the increasing factor each being less than 1; or
    determining the learning rate based on a look-up table and at least one of: quality of the channel, a number of transmitting antennas, and a number of receiving antennas.

4. The method of claim 3, wherein determining the learning rate further comprises:
    normalizing the learning rate with multiplying with $$\frac{HRowLenSquare_i}{maxlenSquare} \text{ or } \frac{1}{maxlenSquare},$$

wherein $HRowLenSquare_i$ represents a sum of squares of all channel elements in the ith row of the channel, and maxlenSquare represents a maximum value of $HRowLenSquare_i$, where i=1, ..., Nr and Nr is a number of receiving antennas.

5. The method of claim 1, wherein detecting the set of transmitted signals in the iterative manner further comprises:
    in each iteration, when a difference between the detected value of one of the set of transmitted signals and a modulation symbol associated with the modulation mode is less than a proximity threshold, setting the detected value of the one of the set of transmitted signals to the modulation symbol.

6. The method of claim 5, wherein the proximity threshold depends on the modulation mode.

7. The method of claim 1, wherein detecting the set of transmitted signals in the iterative manner further comprises:
    determining a set of modulation symbols associated with the modulation mode;
    determining a maximum real part of the set of modulation symbols;
    determining a maximum imaginary part of the set of modulation symbols; and in each iteration,
    when a real part of the detected value for one of the set of transmitted signals exceeds the determined maximum real part, setting the real part to the determined maximum real part; and
    when an imaginary part of the detected value for one of the set of transmitted signals exceeds the determined maximum imaginary part, setting the imaginary part to the determined maximum imaginary part.

8. The method of claim 1, wherein detecting the set of transmitted signals in the iterative manner further comprises:
    ceasing the detection of the set of transmitted signals in response to:
    a predetermined number of iteration being met; or
    a difference between detected values for the set of transmitted signals obtained in current iteration round and last iteration round being less than a convergence threshold.

9. A non-transitory computer readable medium having a computer program stored thereon which, when executed with at least one processor of a device, causes the device to carry out the method of claim 1.

10. A receiver device, comprising a processing circuitry and a non-transitory memory, said memory containing instructions executable with said processing circuitry, to cause said receiver device to:
    obtain a set of received signals;
    determine a channel on which the set of received signals are transported; and
    detect a set of transmitted signals from the set of received signals in an iterative manner with using a gradient descent algorithm and based on the determined channel, a modulation mode for the set of transmitted signals and the set of received signals;
    wherein detecting the set of transmitted signals in the iterative manner comprises:
    in each iteration, when a difference between a detected value of one of the set of transmitted signals and a modulation symbol associated with the modulation mode is less than a proximity threshold, setting the detected value of the one of the set of transmitted signals to the modulation symbol.

11. The receiver device of claim 10, wherein said memory containing instructions executable with said processing circuitry causes said receiver device to detect the set of transmitted signals in the iterative manner with:
    in each iteration round:
    for each of the set of received signals,
    determining a gradient direction for updating the detected value for each of the set of transmitted signals or a detected value for which a value has not been detected, based on a detection error caused with the detected value and an associated channel element in the determined channel;
    determining a learning rate for updating the detected value for each of the set of transmitted signals; and
    updating the detected value for each of the set of transmitted signals with adding a product of the determined learning rate and the determined gradient direction to the detected value.

12. The receiver device of claim 11, wherein said memory containing instructions executable with said processing circuitry causes said receiver device to determine a gradient direction as:

$$\left( y_i - \sum_k h_{ik} * x_k \right) h_{ij}^*$$

where $y_i$ represents a signal received from an ith receiving antenna, $x_k$ represents a signal transmitted from a kth transmitting antenna, $\Sigma$ represents a sum function, $h_{ik}$ represents a channel element from the kth transmitting antenna to the ith receiving antenna, $h_{ij}$ represents a channel element from a jth transmitting antenna to the ith receiving antenna, and $h^*_{ij}$ represents a conjugate of $h_{ij}$, l=1, ... Nr, j and k=1, ... Nt, and Nr and Nt denote a number of receiving antennas and transmitting antennas respectively.

13. The receiver device of claim 11, wherein said memory containing instructions executable with said processing circuitry causes said receiver device to determine the learning rate with:
    determining the learning rate based on a product of an initial learning rate and an increasing factor, both the initial learning rate and the increasing factor being less than 1; or determining the learning rate based on a look-up table and at least one of: quality of the channel, a number of transmitting antennas, and a number of receiving antennas.

14. The receiver device of claim 13, wherein said memory containing instructions executable with said processing circuitry causes said receiver device to determine the learning rate further with:

normalizing the learning rate with multiplying with $$\frac{HRowLenSquare_i}{maxlenSquare} \text{ or } \frac{1}{maxlenSquare},$$

wherein $HRowLenSquare_i$ represents a sum of squares of all channel elements in the ith row of the channel, and maxlenSquare represents a maximum value of $HRowLenSquare_i$, where i=1, . . . , Nr and Nr is a number of receiving antennas.

15. The receiver device of claim 10, wherein the proximity threshold depends on the modulation mode.

16. The receiver device of claim 10, wherein said memory containing instructions executable with said processing circuitry causes said receiver device to detect the set of transmitted signals in the iterative manner with:
determining a set of modulation symbols associated with the modulation mode;
determining a maximum real part of the set of modulation symbols;
determining a maximum imaginary part of the set of modulation symbols; and in each iteration,
when a real part of the detected value for one of the set of transmitted signals exceeds the determined maximum real part, setting the real part to the determined maximum real part; and
when an imaginary part of the detected value for one of the set of transmitted signals exceeds the determined maximum imaginary part, setting the imaginary part to the determined maximum imaginary part.

17. The receiver device of claim 10, wherein said memory containing instructions executable with said processing circuitry causes said receiver device to detect the set of transmitted signals in the iterative manner with:
ceasing the detection in response to:
a predetermined number of iteration being met; or
a difference between detected values for the set of transmitted signals obtained in current iteration round and last iteration round being less than a convergence threshold.

18. A receiver device, comprising a processing circuitry and a non-transitory memory, said memory containing instructions executable with said processing circuitry, to cause said receiver device to:
obtain a set of received signals;
determine a channel on which the set of received signals are transported; and
detect a set of transmitted signals from the set of received signals in an iterative manner with using a gradient descent algorithm and based on the determined channel, a modulation mode for the set of transmitted signals and the set of received signals;
determine a set of modulation symbols associated with the modulation mode;
determine a maximum real part of the set of modulation symbols;
determine a maximum imaginary part of the set of modulation symbols; and in each iteration,
when a real part of the detected value for one of the set of transmitted signals exceeds the determined maximum real part, setting the real part to the determined maximum real part; and
when an imaginary part of the detected value for one of the set of transmitted signals exceeds the determined maximum imaginary part, setting the imaginary part to the determined maximum imaginary part.

19. The receiver device of claim 18, wherein said memory containing instructions executable with said processing circuitry causes said receiver device to detect the set of transmitted signals in the iterative manner with:
in each iteration round:
for each of the set of received signals,
determining a gradient direction for updating the detected value for each of the set of transmitted signals or a detected value for which a value has not been detected, based on a detection error caused with the detected value and an associated channel element in the determined channel;
determining a learning rate for updating the detected value for each of the set of transmitted signals; and
updating the detected value for each of the set of transmitted signals with adding a product of the determined learning rate and the determined gradient direction to the detected value.

20. The receiver device of claim 19, wherein said memory containing instructions executable with said processing circuitry causes said receiver device to determine the learning rate with:
determining the learning rate based on a product of an initial learning rate and an increasing factor, both the initial learning rate and the increasing factor being less than 1; or
determining the learning rate based on a look-up table and at least one of: quality of the channel, a number of transmitting antennas, and a number of receiving antennas.

* * * * *